(12) United States Patent
Lee

(10) Patent No.: US 9,268,554 B2
(45) Date of Patent: Feb. 23, 2016

(54) CONTROLLING METHOD, MEMORY CONTROLLER, AND DATA TRANSMISSION SYSTEM

(71) Applicant: PHISON ELECTRONICS CORP., Miaoli (TW)

(72) Inventor: Chien-Fu Lee, Yunlin County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 245 days.

(21) Appl. No.: 13/831,848

(22) Filed: Mar. 15, 2013

(65) Prior Publication Data

US 2014/0215131 A1 Jul. 31, 2014

(30) Foreign Application Priority Data

Jan. 31, 2013 (TW) .............................. 102103807 A

(51) Int. Cl.
*G06F 12/00* (2006.01)
*G06F 9/445* (2006.01)
*G06F 3/06* (2006.01)

(52) U.S. Cl.
CPC .............. *G06F 8/665* (2013.01); *G06F 3/0607* (2013.01); *G06F 3/0632* (2013.01); *G06F 3/0659* (2013.01); *G06F 3/0679* (2013.01)

(58) Field of Classification Search
None
See application file for complete search history.

(56) References Cited

U.S. PATENT DOCUMENTS

2014/0181365 A1* 6/2014 Fanning et al. ................ 711/103

FOREIGN PATENT DOCUMENTS

TW 200743957 12/2007

OTHER PUBLICATIONS

"Office Action of Taiwan Counterpart Application", issued on Jan. 21, 2015, p. 1-p. 6.

* cited by examiner

*Primary Examiner* — Midys Rojas
(74) *Attorney, Agent, or Firm* — Jianq Chyun IP Office

(57) ABSTRACT

A controlling method of a rewritable non-volatile memory module, and a memory controller and a data transmission system using the same are provided. The controlling method includes following steps. A command is received from a host system. Whether the command is a configuration command is determined according to a command code of the command. A plurality of action information in the configuration command and an execution sequence corresponding to the action information are analyzed. The action information is executed according to the execution sequence. Each action information is configured to request the rewritable non-volatile memory module to execute a predetermined action. Thereby, the functionality of a memory storage device can be dynamically extended.

21 Claims, 6 Drawing Sheets

CONTROLLING METHOD, MEMORY CONTROLLER, AND DATA TRANSMISSION SYSTEM

CROSS-REFERENCE TO RELATED APPLICATION

This application claims the priority benefit of Taiwan application serial no. 102103807, filed on Jan. 31, 2013. The entirety of the above-mentioned patent application is hereby incorporated by reference herein and made a part of this specification.

BACKGROUND

1. Technology Field

The invention generally relates to a controlling method, and more particularly, to a controlling method of a rewritable non-volatile memory module, a memory controller, and a data transmission system.

2. Description of Related Art

Along with the widespread of digital cameras, cell phones, and MP3 players in recently years, the consumers' demand to storage media has increased drastically. Rewritable non-volatile memory (for example, flash memory) is one of the most adaptable storage media to aforementioned portable multimedia devices due to its many characteristics such as data non-volatility, low power consumption, small volume, and non-mechanical structure.

A rewritable non-volatile memory module is usually controlled by a memory controller. The memory controller provides a plurality of commands to a host system, and the host system issues these commands to the memory controller to control the rewritable non-volatile memory module. However, these commands are set up when the memory controller is manufactured. If the manufacturer of the memory controller wants to add a new command to accomplish a specific function, the manufacturer of the memory controller has to re-design the memory controller, which is very tedious and inflexible. Thereby, how to dynamically extend the functionality of a memory controller has become a subject to be resolved in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, exemplary embodiments of the invention are directed to a controlling method of a rewritable non-volatile memory module, a memory controller, and a data transmission system, in which the functionality of a memory controller can be dynamically extended.

An exemplary embodiment of the invention provides a controlling method of a rewritable non-volatile memory module. The controlling method includes following steps. A first command is received from the host system. Whether the first command is a configuration command is determined according to a first command code of the first command. A plurality of first action information in the configuration command and a first execution sequence corresponding to the first action information are analyzed. The first action information is executed according to the first execution sequence, where each of the first action information is configured to request the rewritable non-volatile memory module to execute a predetermined action.

An exemplary embodiment of the invention provides a data transmission system including a host system and a memory storage device. The memory storage device includes a rewritable non-volatile memory module. The memory storage device receives a first command from the host system and determines whether the first command is a configuration command according to a first command code of the first command. The memory storage device also analyzes a plurality of first action information in the configuration command and a first execution sequence corresponding to the first action information and executes the first action information according to the first execution sequence. Each of the first action information is configured to request the rewritable non-volatile memory module to execute a predetermined action.

An exemplary embodiment of the invention provides a memory controller for controlling a rewritable non-volatile memory module. The rewritable non-volatile memory module includes a plurality of physical erasing units. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit receives a first command from the host system and determines whether the first command is a configuration command according to a first command code of the first command. The memory management circuit also analyzes a plurality of first action information in the configuration command and a first execution sequence corresponding to the first action information and executes the first action information according to the first execution sequence. Each of the first action information is configured to request the rewritable non-volatile memory module to execute a predetermined action.

As described above, in a controlling method of a rewritable non-volatile memory module, a memory controller, and a data transmission system provided by exemplary embodiments of the invention, a host system can send specific action information to a memory storage device through a configuration command, so that the functionality of the memory storage device can be dynamically extended.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
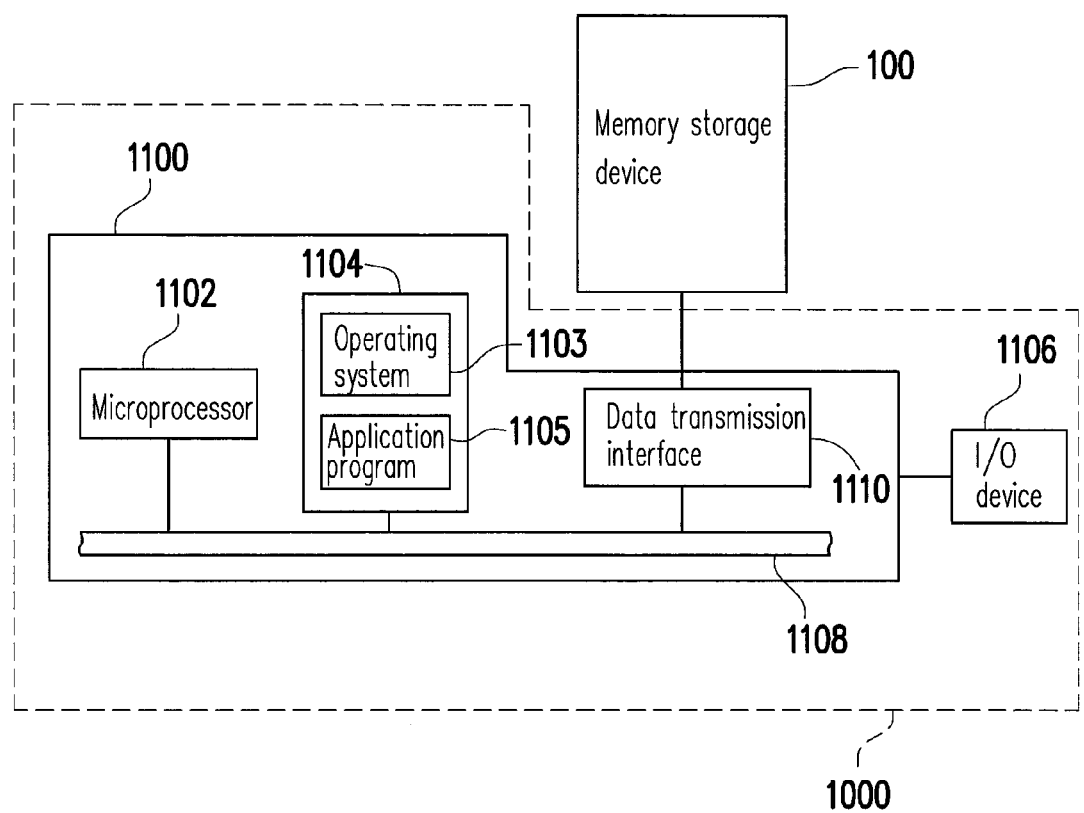
FIG. 1A illustrates a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a rewritable non-volatile memory module and a controller (also referred to as a control circuit). A memory storage device is usually used with a host system so that the host system can write data into or read data from the memory storage device.

FIG. 1A illustrates a host system and a memory storage device according to an exemplary embodiment.

Figure 1B:
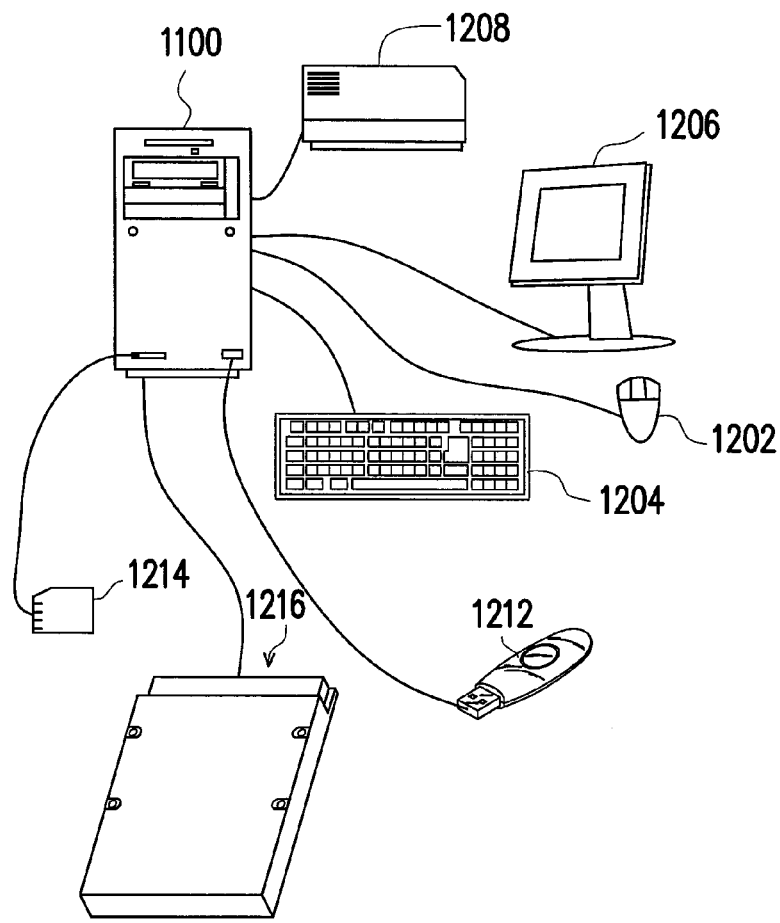
FIG. 1B is a diagram of a computer, an input/output (I/O) device, and a memory storage device according to an exemplary embodiment.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. An operating system (OS) 1103 and an application program 1105 are loaded into the RAM 1104 and run by the microprocessor 1102. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, a memory storage device 100 is coupled to other components of the host system 1000 through the data transmission interface 1110. Data can be written into or read from the memory storage device 100 through the operations of the microprocessor 1102, the RAM 1104, and the I/O device 1106. The memory storage device 100 is a rewritable non-volatile memory storage device, such as the flash drive 1212, the memory card 1214, or the solid state drive (SSD) 1216 illustrated in FIG. 1B.

Figure 1C:
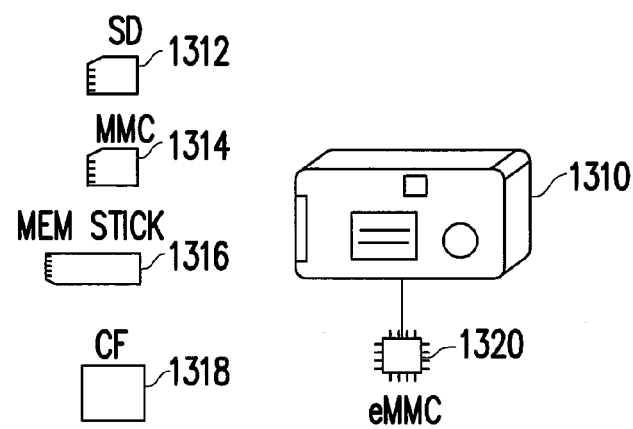
FIG. 1C is a diagram of a host system and a memory storage device according to an exemplary embodiment.

Generally speaking, the host system 1000 can be substantially any system that works with the memory storage device 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that an eMMC is directly coupled to the motherboard of a host system.

Figure 2:
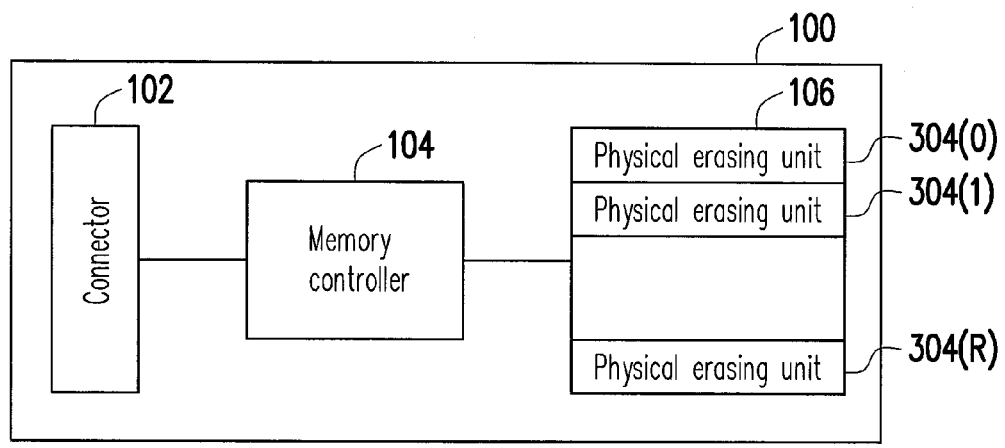
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment, the connector 102 complies with the universal serial bus (USB) standard. However, the invention is not limited thereto, and the connector 102 may also comply with the serial advanced technology attachment (SATA) standard, the parallel advanced technology attachment (PATA) standard, the Institute of Electrical and Electronic Engineers (IEEE) 1394 standard, the peripheral component interconnect (PCI) express standard, the SD interface standard, the ultra high speed-I (UHS-I) interface standard, the ultra high speed-II (UHS-II) interface standard, the MS interface standard, the MMC interface standard, the eMMC interface standard, the universal flash storage (UFS) interface standard, the CF interface standard, the integrated device electronics (IDE) standard, or any other suitable standard.

The memory controller 104 executes a plurality of logic gates or commands implemented in a hardware form or a firmware form and performs data writing, reading, and erasing operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has physical erasing units 304(0)-304(R). The physical erasing units 304(0)-304(R) may belong to a same memory die or different memory dies. Each physical erasing unit has a plurality of physical programming units. The physical programming units belonging to the same physical erasing unit can be individually written but have to be erased all together. Each physical erasing unit may be composed of 128 physical programming units. However, the invention is not limited thereto, and each physical erasing unit may also be composed of 64, 256, or any other number of physical programming units.

To be specific, physical erasing unit is the smallest unit for erasing data. Namely, each physical erasing unit contains the least number of memory cells that are erased all together. Physical programming unit is the smallest unit for programming data. Namely, physical programming unit is the smallest unit for writing data. Each physical programming unit usually includes a data bit area and a redundant bit area. The data bit area includes a plurality of physical access addresses for storing user data, and the redundant bit area is used for storing system data (for example, control information and error checking and correcting codes (ECCs)). In the present exemplary embodiment, the data bit area of each physical programming unit includes 4 physical access addresses, and the size of each physical access address is 512 bytes (B). However, the size and number of the physical access addresses are not limited in the invention, and in other exemplary embodiments, a data bit area may also include 8, 16, or any other greater or smaller number of physical access addresses. The physical erasing units may be physical blocks, and the physical programming units may be physical pages or physical sectors.

In the present exemplary embodiment, the rewritable non-volatile memory module 106 is a multi level cell (MLC) NAND flash memory module (i.e., each memory cell stores at least two bit data). However, the invention is not limited thereto, and the rewritable non-volatile memory module 106 may also be a single level cell (SLC) NAND flash memory module, a trinary level cell (TLC) NAND flash memory module, any other flash memory module, or any memory module with the same characteristics.

Figure 3:
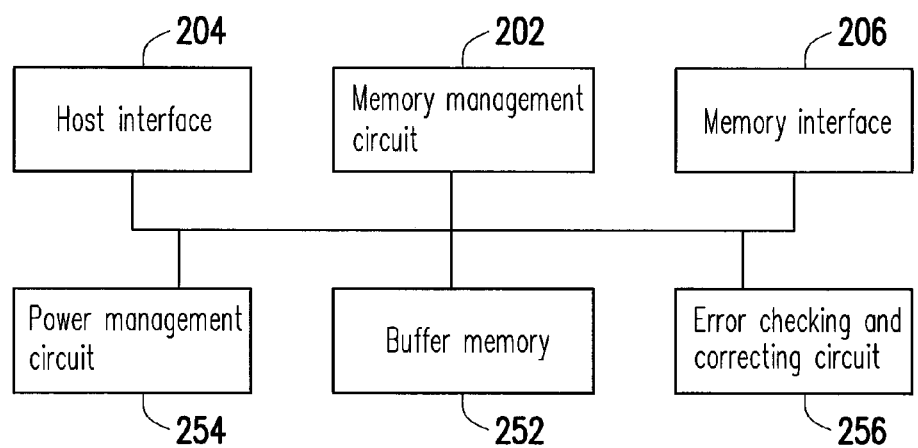
FIG. 3 is a schematic block diagram of a memory controller according to an exemplary embodiment.

FIG. 3 is a schematic block diagram of a memory controller according to an exemplary embodiment.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of commands, and when the memory storage device 100 is in operation, the commands are executed to perform various data writing, data reading, and data erasing operations. Below, the operation of the memory management circuit 202 will be described, and the operation of the memory controller 104 can be referred to the description related to the operation of the memory management circuit 202 therefore will not be described.

In the present exemplary embodiment, the commands of the memory management circuit 202 are implemented in a firmware form. For example, the memory management circuit 202 has a microprocessor unit (not shown) and a read-only memory (ROM, not shown), and the commands are burnt into the ROM. When the memory storage device 100 is in operation, the commands are executed by the microprocessor unit to carry out data writing, data reading, and data erasing operations.

In another exemplary embodiment of the invention, the commands of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a driving code segment. When the memory controller 104 is enabled, the microprocessor unit first executes the driving code segment to load the commands from the rewritable non-volatile memory module 106 into the RAM of the memory management circuit 202. Thereafter, the microprocessor unit runs the commands to perform various data writing, reading, and erasing operations.

The host interface 204 is coupled to the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 complies with the USB standard. However, the invention is not limited thereto, and the host interface 204 may also comply with the PATA standard, the IEEE 1394 standard, the PCI express standard, the SATA standard, the UHS-I interface standard, the UHS-II interface standard, the MS standard, the MMC standard, the eMMC interface standard, the UFS interface standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to perform an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 performs the ECC procedure on the data according to the ECC code.

Figure 4:
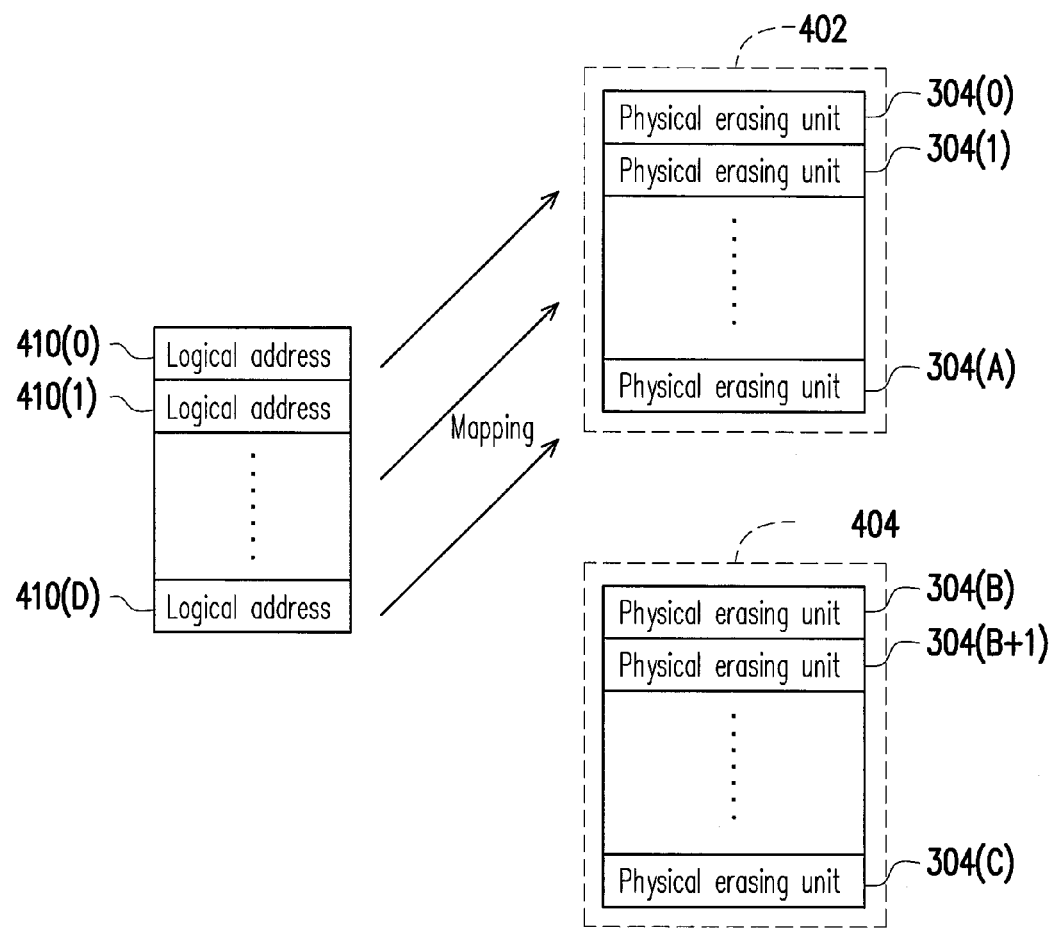
FIG. 4 is a diagram illustrating an example of how a rewritable non-volatile memory module is managed according to an exemplary embodiment.

FIG. 4 is a diagram illustrating an example of how a rewritable non-volatile memory module is managed according to an exemplary embodiment.

It should be understood that while describing the operations performed on the physical erasing units of the rewritable non-volatile memory module 106, the terms like "select", "group", and "associate" refer to logical operations performed on the physical erasing units. Namely, the actual positions of the physical erasing units in the rewritable non-volatile memory module 106 are not changed and the operations are logically performed on the physical erasing units of the rewritable non-volatile memory module 106.

Referring to FIG. 4, the memory controller 104 logically groups the physical erasing units 304(0)-304(R) of the rewritable non-volatile memory module 106 into a plurality of areas, such as a data area 402 and a hidden area 404. The physical erasing units in the data area 402 are used for storing data from the host system 1000. Usually, the OS 1103 of the host system 1000 can access the physical erasing units in the data area 402 but cannot access the physical erasing units in the hidden area 404. The physical erasing units in the hidden area 404 are used for storing data from the application program 1105 or data generated during the operation of the memory controller 104. It should be noted that the grouping of the physical erasing units 304(0)-304(R) is not limited to aforementioned areas in the invention, and the memory management circuit 202 may further group the physical erasing units 304(0)-304(R) into a system area, a spare area, a replacement area, or other areas. In short, physical erasing units logically belonging to the system area are used for recording system data, such as the manufacturer and model number of the memory chip, the number of physical erasing units in the memory chip, and the number of physical programming units in each physical erasing unit. Physical erasing units logically belonging to the replacement area are replacement physical erasing units. For example, when the rewritable non-volatile memory module is just manufactured, 4% of its physical erasing units are reserved for replacement purpose. Namely, when a physical erasing unit outside the replacement area is damaged, a physical erasing unit is selected from the replacement area for substituting the damaged physical erasing unit. In an exemplary embodiment, the system area and the hidden area 404 can be combined. However, the invention is not limited thereto.

In the present exemplary embodiment, the memory management circuit 202 configures logical addresses 410(0)-410(D) to access data in the physical erasing units in the data area 402. For example, when the memory storage device 100 is formatted by the OS 1103 through a file system (for example, FAT 32), the logical addresses 410(0)-410(D) are respectively mapped to the physical erasing units 304(0)-304(A) in the data area 402. The memory management circuit 202 establishes a logical address-physical erasing unit mapping table to record the mapping relationship between the logical addresses and the physical erasing units. In the present exemplary embodiment, the size of each of the logical addresses 410(0)-410(D) is the same as that of each of the physical erasing units 304(0)-304(A) (i.e., the logical addresses may also be referred to as logical block addresses (LBA)). However, the invention is not limited thereto, and in other exemplary embodiments, each of the logical addresses 410(0)-410(D) may also have the size of a physical programming unit or any other size.

The memory management circuit 202 provides a plurality of commands of the rewritable non-volatile memory module 106 to the host system 1000, so that the OS 1103 can access data in the data area 402 through these commands. The application program 1105 may also issue these commands through the OS 1103 to execute some special operations. These command may include read commands, write commands, commands for setting user passwords, commands for setting some physical erasing units as read-only commands, or any other command. However, the contents of these commands are not limited in the invention. Particularly, the memory management circuit 202 further provides a plurality of action information to the host system 1000, and the application program 1105 can accomplish specific functions according to the action information. To be specific, each action information is used to request the rewritable non-volatile memory module 106 to execute a predetermined action. A predetermined action may request the rewritable non-volatile memory module 106 to read a data, write a data, or erase a physical erasing unit. However, the contents of these predetermined actions are not limited in the invention. When the commands provided by the memory management circuit 202 cannot accomplish a specific function, the application program 1105 selects at least one action information and determines an execution sequence of the action information. The application program 1105 sends the selected action information and the execution sequence to the memory management circuit 202 through a configuration command. The memory management circuit 202 accomplishes the specific function according to the configuration command.

Figure 5:
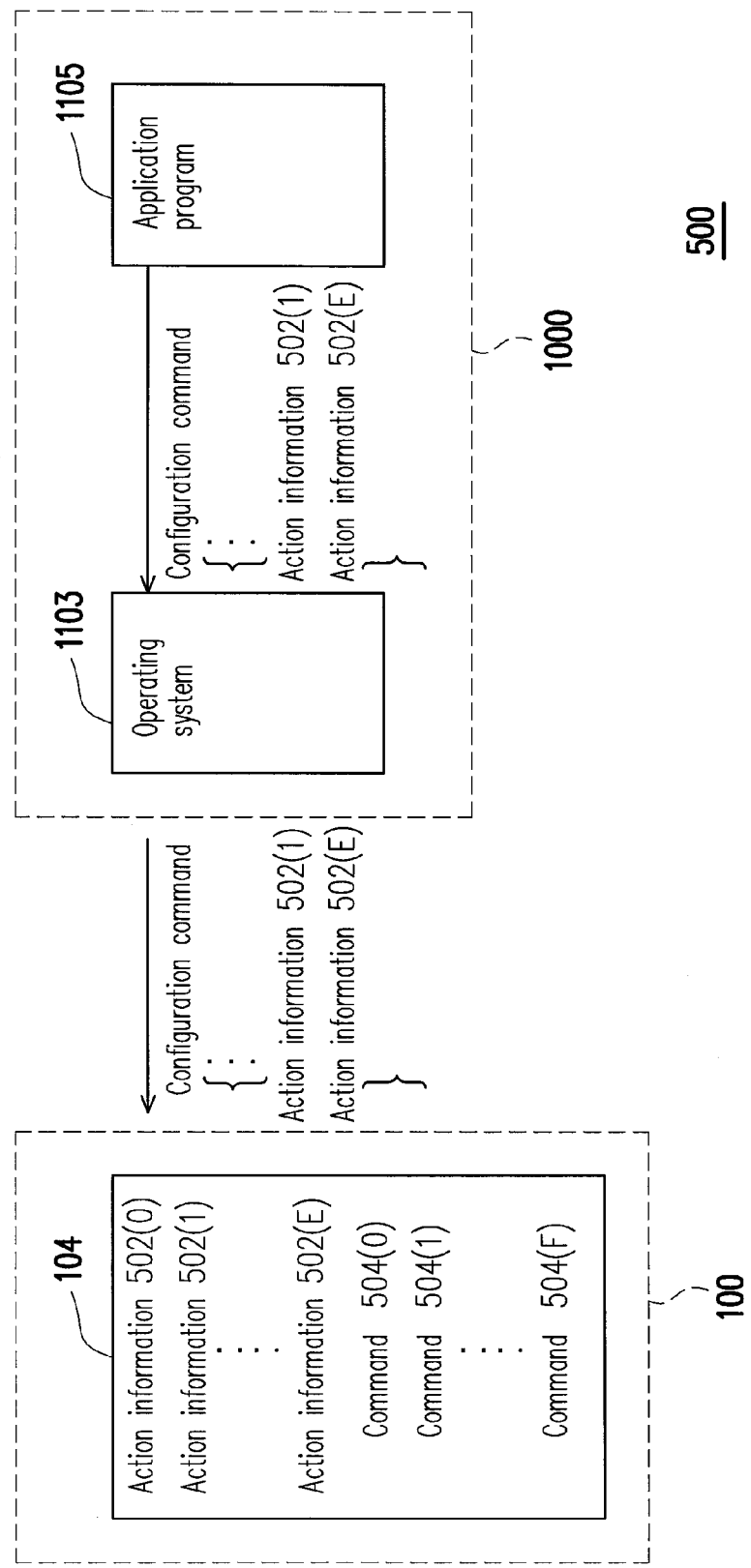
FIG. 5 is a diagram illustrating how a configuration command is sent according to an exemplary embodiment.

FIG. 5 is a diagram illustrating how a configuration command is sent according to an exemplary embodiment.

Referring to FIG. 5, the data transmission system 500 includes the host system 1000 and the memory storage device 100. The memory management circuit 202 provides action information 502(0)-502(E) and commands 504(0)-504(F) for the rewritable non-volatile memory module 106 to the host system 1000. Each of the commands 504(0)-504(F) includes a command code, and the command code indicates the type of the command (for example, a write command or a read command). When the memory management circuit 202 receives a first command from the host system 1000, it determines whether the first command is a configuration command according to the command code (also referred to as a first command code) of the first command. If the first command is a configuration command, the memory management circuit 202 analyzes the configuration command to obtain a plurality of action information and an execution sequence of the action information. For example, the configuration command sent by the application program 1105 includes action information 502(1) and 502(E) (also referred to as a first action information). After receiving the configuration command, the memory management circuit 202 analyzes the configuration command to obtain the execution sequence (also referred to as a first execution sequence) of the action information 502(1) and 502(E). The memory management circuit 202 executes the action information 502(1) and 502(E) according to the first execution sequence. If an execution result is generated by executing the action information 502(1) and 502(E), the memory management circuit 202 sends the execution result back to the host system 1000.

In an exemplary embodiment, the application program 1105 sends a plurality of configuration commands to the memory management circuit 202, and these configuration commands may include different action information or different execution sequences. For example, the memory management circuit 202 receives a second command from the host system 1000. The command code of the second command is the same as the command code of the first command (i.e., the second command is also a configuration command). The second command includes a plurality of second action information. In an exemplary embodiment, the second action information is the same as the first action information in the first command, but the execution sequence (also referred to as a second execution sequence) corresponding to the second action information is different from the execution sequence of the first action information. In another exemplary embodiment, the execution sequence corresponding to the second action information is the same as the execution sequence corresponding to the first action information, but one of the second action information is different from any first action information. In other words, the application program 1105 can select any action information and determine any execution sequence. It should be noted that the execution sequence can be the arranged sequence of the action information, where the arranged sequence of the action information may be provided as a code segment in the configuration command or as a sort command independent to the configuration command.

In an exemplary embodiment, after receiving the first command, the memory management circuit 202 establishes a new command according to the action information 502(1) and 502(E) and the execution sequence thereof. The new command includes at least the action information 502(1) and 502(E), and the new command is different from the commands 504(0)-504(F). The memory management circuit 202 stores the new command into the rewritable non-volatile memory module 106. For example, the memory management circuit 202 stores the new command into a physical erasing unit in the hidden area 404 (as shown in FIG. 4). When the application program 1105 requires the function corresponding to the new command, the application program 1105 sends an execution command to the memory management circuit 202 to instruct the memory management circuit 202 to execute the new command. After receiving the execution command, the memory management circuit 202 executes the new command. Thus, the new command can be repeatedly executed.

Figure 6:
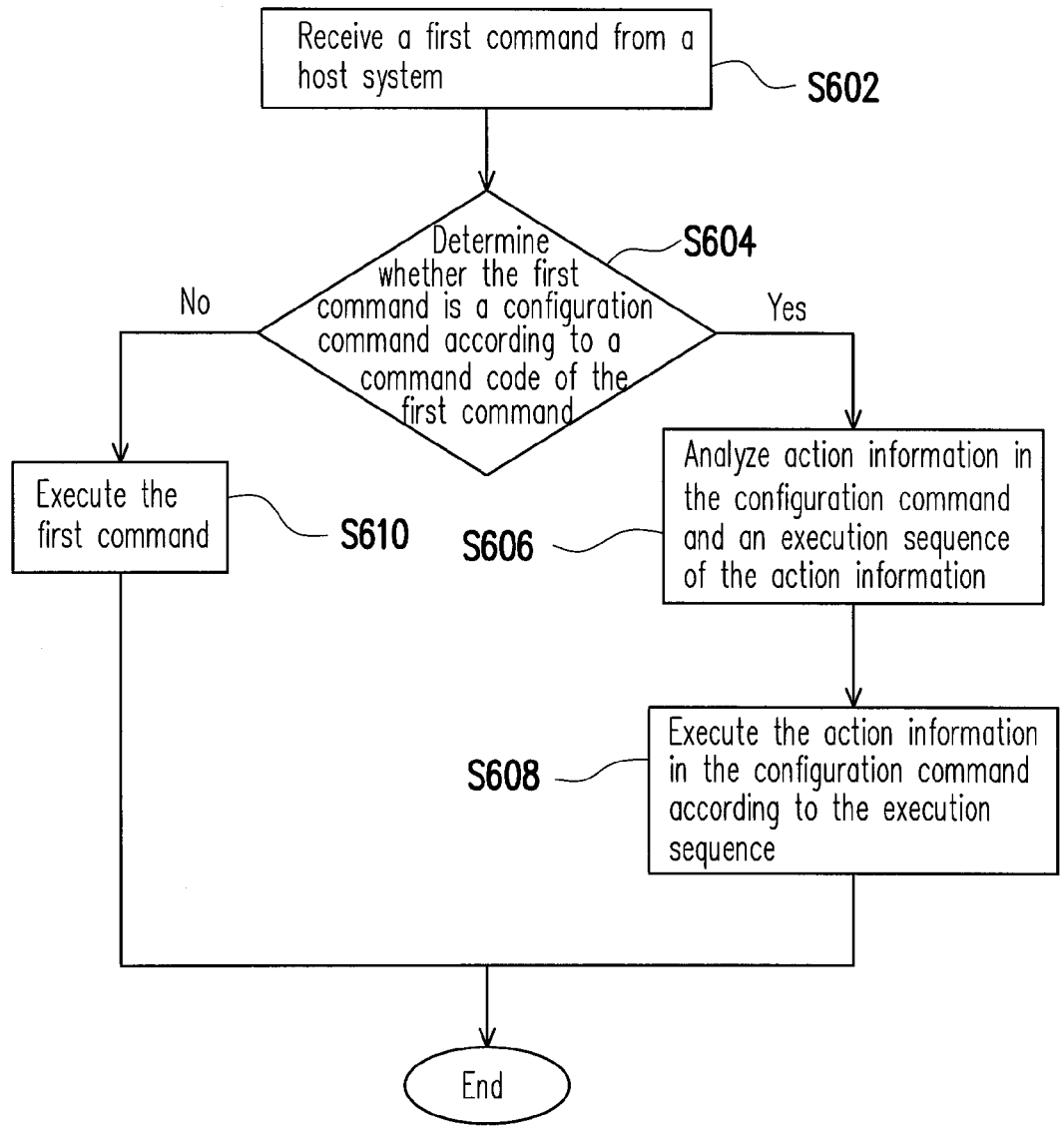
FIG. 6 is a flowchart of a controlling method of a rewritable non-volatile memory module according to an exemplary embodiment.

FIG. 6 is a flowchart of a controlling method of a rewritable non-volatile memory module according to an exemplary embodiment.

Referring to FIG. 6, in step S602, a first command is received from a host system. In step S604, whether the first command is a configuration command is determined according to a command code of the first command. If it is determined in step S604 that the first command is a configuration command, the action information in the configuration command and an execution sequence of the action information are analyzed (step S606), and the action information in the configuration command is executed according to the execution sequence (step S608). If it is determined in step S604 that the first command is not a configuration command, the first command is executed (step S610). Various steps illustrated in FIG. 6 have been explained in detail above therefore will not be further described herein.

As described, in a controlling method, a memory controller, and a data transmission system provided by exemplary embodiments of the invention, a plurality of action information is sent to a memory storage device through a configuration command, so that the memory storage device can execute the action information according to a specific execution sequence to accomplish a specific function. Thereby, the functionality of the memory storage device is dynamically extended.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A controlling method for a rewritable non-volatile memory module, comprising:
   receiving a first command from a host system;
   determining whether the first command is a configuration command according to a first command code of the first command;
   when the first command is determined as the configuration command, analyzing a plurality of first action information in the configuration command, analyzing a first execution sequence corresponding to the first action information, and executing the first action information according to the first execution sequence, wherein each of the first action information is configured to request the rewritable non-volatile memory module to execute a predetermined action; and
   when the first command is determined not as the configuration command, executing the first command.

2. The controlling method according to claim 1 further comprising:
   receiving a second command from the host system, wherein the second command comprises a second command code and a plurality of second action information, the second command code is the same as the first command code, the second action information is the same as the first action information, and a second execution sequence corresponding to the second action information is different from the first execution sequence.

3. The controlling method according to claim 1 further comprising:
   receiving a second command from the host system, wherein the second command comprises a second command code and a plurality of second action information, the second command code is the same as the first command code, one of the second action information is different from the first action information, and a second execution sequence corresponding to the second action information is the same as the first execution sequence.

4. The controlling method according to claim 1 further comprising:
   sending an execution result of the first action information to the host system.

5. The controlling method according to claim 1 further comprising:
   establishing a new command according to the first action information and the first execution sequence; and
   storing the new command into the rewritable non-volatile memory module.

6. The controlling method according to claim 5 further comprising:
   receiving an execution command from the host system; and
   executing the new command according to the execution command.

7. The controlling method according to claim 6, wherein the rewritable non-volatile memory module comprises a plurality of physical erasing units, the controlling method further comprising:
   grouping the physical erasing units at least into a data area and a hidden area; and
   configuring a plurality of logical addresses to map to the physical erasing units in the data area,
   wherein the step of storing the new command into the rewritable non-volatile memory module comprises:
   storing the new command into the hidden area.

8. A data transmission system, comprising:
   a host system; and
   a memory storage device, comprising a rewritable non-volatile memory module, configured to receive a first command from the host system and determine whether the first command is a configuration command according to a first command code of the first command,
   wherein, when the first command is determined as the configuration command, the memory storage device is configured to analyze a plurality of first action information in the configuration command, analyze a first execution sequence corresponding to the first action information, and execute the first action information according to the first execution sequence, wherein each of the first action information is configured to request the rewritable non-volatile memory module to execute a predetermined action,
   wherein, when the first command is determined not as the configuration command, the memory storage device is configured to execute the first command.

9. The data transmission system according to claim 8, wherein the memory storage device is further configured to receive a second command from the host system, the second command comprises a second command code and a plurality of second action information, the second command code is the same as the first command code, the second action information is the same as the first action information, and a second execution sequence corresponding to the second action information is different from the first execution sequence.

10. The data transmission system according to claim 8, wherein the memory storage device is further configured to receive a second command from the host system, the second command comprises a second command code and a plurality of second action information, the second command code is the same as the first command code, one of the second action information is different from the first action information, and a second execution sequence corresponding to the second action information is the same as the first execution sequence.

11. The data transmission system according to claim 8, wherein the memory storage device is further configured to send an execution result of the first action information to the host system.

12. The data transmission system according to claim 8, wherein the memory storage device is further configured to establish a new command according to the first action information and the first execution sequence and store the new command into the rewritable non-volatile memory module.

13. The data transmission system according to claim 12, wherein the memory storage device is further configured to receive an execution command from the host system and execute the new command according to the execution command.

14. The data transmission system according to claim 13, wherein the rewritable non-volatile memory module comprises a plurality of physical erasing units, and the memory storage device is further configured to group the physical erasing units at least into a data area and a hidden area, and configure a plurality of logical addresses to map to the physical erasing units in the data area, wherein the new command is stored in the hidden area.

15. A memory controller, for controlling a rewritable non-volatile memory module, wherein the rewritable non-volatile memory module comprises a plurality of physical erasing units, the memory controller comprising:

a host interface, configured to couple to a host system;

a memory interface, configured to couple to the rewritable non-volatile memory module; and a memory management circuit, coupled to the host interface and the memory interface, configured to receive a first command from the host system and determine whether the first command is a configuration command according to a first command code of the first command, wherein, when the first command is determined as the configuration command, the memory management circuit is configured to analyze a plurality of first action information in the configuration command, analyze a first execution sequence corresponding to the first action information, and execute the first action information according to the first execution sequence, wherein each of the first action information is configured to request the rewritable non-volatile memory module to execute a predetermined action, wherein, when the first command is determined not as the configuration command, the memory management circuit is configured to execute the first command.

16. The memory controller according to claim 15, wherein the memory management circuit is further configured to receive a second command from the host system, the second command comprises a second command code and a plurality of second action information, the second command code is the same as the first command code, the second action information is the same as the first action information, and a second execution sequence corresponding to the second action information is different from the first execution sequence.

17. The memory controller according to claim 15, wherein the memory management circuit is further configured to receive a second command from the host system, the second command comprises a second command code and a plurality of second action information, the second command code is the same as the first command code, one of the second action information is different from the first action information, and a second execution sequence corresponding to the second action information is the same as the first execution sequence.

18. The memory controller according to claim 15, wherein the memory management circuit is further configured to send an execution result of the first action information to the host system.

19. The memory controller according to claim 15, wherein the memory management circuit is further configured to establish a new command according to the first action information and the first execution sequence, and store the new command into the rewritable non-volatile memory module.

20. The memory controller according to claim 19, wherein the memory management circuit is further configured to receive an execution command from the host system and execute the new command according to the execution command.

21. The memory controller according to claim 20, wherein the rewritable non-volatile memory module comprises a plurality of physical erasing units, and the memory management circuit is further configured to group the physical erasing units at least into a data area and a hidden area, and configure a plurality of logical addresses to map to the physical erasing units in the data area, wherein the new command is stored in the hidden area.

* * * * *